REEL CARRIAGE

Filed April 5, 1968

INVENTORS
RALPH MASLOW
ARTHUR L MASLOW
Friedman & Goodman
ATTORNEYS

REEL CARRIAGE

Filed April 5, 1968

INVENTORS
RALPH MASLOW
ARTHUR L MASLOW
BY Friedman & Goodman
ATTORNEYS

United States Patent Office 3,477,584
Patented Nov. 11, 1969

3,477,584
REEL CARRIAGE

Ralph Maslow and Arthur L. Maslow, both of 5 Reynal Crossing, Scarsdale, N.Y. 10583

Filed Apr. 5, 1968, Ser. No. 719,008
Int. Cl. A47g *29/00;* G03c *17/56;* A47b *81/00*
U.S. Cl. 211—40 4 Claims

ABSTRACT OF THE DISCLOSURE

A reel carriage adapted to carry reels or reel cases provided with a hooking member on the periphery thereof, said carriage comprising a generally rectangular cubic container, a first rod extending between two parallel top sides and connecting the same, a second rod positioned beneath said first rod and in the same vertical plane as said first rod, said second rod positioned when containing a reel in elevated position from the bottom sides via yielding members, said second rod adapted to pass through the core of a reel or reel case suspended therein and to bear against said core.

BACKGROUND OF THE INVENTION

Field of the invention

This invention relates to a carriage or package for reels or reel cases. More particularly, this invention relates to a carriage or package to contain reels containing computer tapes. In a desirable embodiment, this invention relates to such a computer reel or reel case carriage which is adaptable to be stacked one on top of another and which is also adaptable to be affixed side by side to another such carriage.

Discussion of the prior art

Computer reels are presently stored in ordinary containers. These containers either allow free movement of the reels within the container or hold the reels rigid. Neither is particularly desirable. If the reel is permitted to move freely within the container extensive movement of the reel may result in damage to the reel with possible ensuing damage to the tape. Such damage is quite costly since only reels in good repair can be used in computer operations. By the same token, if the reels are held rigidly within the container, any force impact upon the container from an exterior source is fully directed and absorbed by the reel itself with the result that, since the reel cannot move in response to force, the reel is damaged. Thus, a reel carriage which does not permit free movement of reels or reel cases enveloping reels contained therein but does not hold the reels or cases rigid is desirable.

SUMMARY OF THE INVENTION

Objects of the invention

It is an object of this invention, therefore, to provide a reel carriage which does not permit free movement of reels contained therein but does not hold the reels in a rigid position.

It is yet another object of this invention, therefore, to provide such a reel carriage which, due to its construction, permits stacking of a plurality of carriages one on the other.

It is another object of this invention, therefore, to provide such a reel carriage which also permits reel carriages to be fastened together side by side.

These and other objects of this invention will become apparent from the following complete description, accompanying drawings and appended claims.

Statement of the invention

Broadly, this invention contemplates a reel carriage adapted to carry reels or reel cases provided with a hooking member on the periphery thereof and a hollow core, said carriage comprising a generally rectangular cubic container, a first rod extending between two parallel top sides and connecting the same, a second rod positioned beneath said first rod and in the same vertical plane as said first rod, said second rod positioned when containing a reel in elevated position from the bottom sides via yielding members, said second rod adapted to pass through the core of a reel suspended therein and to bear against said core.

In a particularly desirable embodiment, this invention contemplates such a reel carriage wherein on the top corners there are upwardly and inwardly extending members adaptable to function as the seat for a second reel carriage positioned thereover.

In a still more desirable embodiment, this invention contemplates such a reel carriage wherein at each bottom corner there are a pair of wires one each originating from a side forming the base of said carriage at a point proximate said corner, each of said wires rising toward one another and terminating at a junction above the top sides of said carriage, said junction comprising the upwardly and inwardly extending members forming the seat for a second reel carriage positioned thereover. The wires have a parabolic shape.

In a most preferred form of this invention, the device is constructed of wires or rods such as sturdy unyielding steel wires or rods and the yielding members above referred to are coil springs.

Description of the drawings

The invention can be more readily understood and appreciated when reference is made to the accompanying drawings, in which.

Description of preferred embodiments

Figures 1, 2, 3, 4:
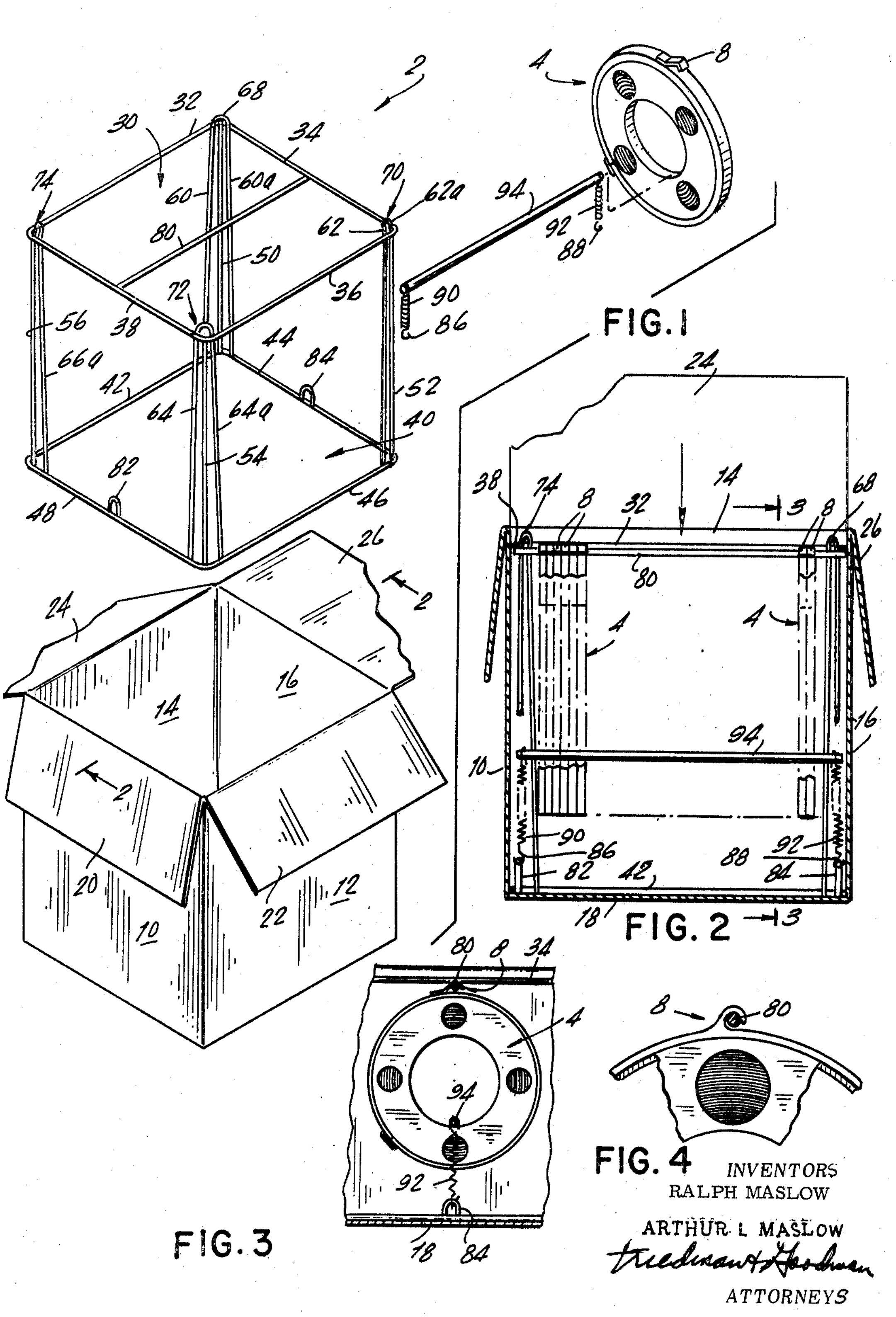
FIGURE 1 is an exploded perspective view showing the reel carriage, the aforementioned second rod with springs, a typical computer reel provided with a hook on its periphery and an ordinary cardboard carton into which the carriage containing the reel can be placed.
FIGURE 2 is a sectional elevation taken along the line 2—2 of FIG. 1.
FIGURE 3 is a sectional elevation taken along the line 3—3 of FIG. 2.
FIGURE 4 is a detail of a portion of FIG. 3.

A preferred embodiment is illustrated in the accompanying drawings, in which the carriage is indicated by reference numeral 2, a computer reel which can be carried therein by reference numeral 4, and a carton into which the carriage can be placed by numeral 6. The computer reel or computer reel casing is provided on its periphery with a hook 8 as seen particularly in FIGS. 3 and 4. The carton comprises sides 10, 12, 14 and 16, bottom 18 and upper flaps 20, 22, 24 and 26. The carriage comprises a rectangular cubic container constructed to a wire or rod material. It has a top piece consisting of wire forming a rectangle generally represented by reference numeral 30 comprising sides 32, 34, 36 and 38 and a similar bottom piece generally represented by reference numeral 40 comprising sides 42, 44, 46 and 48. The corners are joined by vertical members 50, 52, 54 and 56. At each corner there are a pair of wires, one each originating from a side forming the base or bottom of said carriage at a point proximate said corner, each of said wires rising toward one another and terminating at a junction above the top side 30 in an upwardly and inwardly extending generally parabolic U-shaped junction. These wires are designated 60, **60*a*, 62, 62*a*, 64, 64*a*, 66 and 66*a*. The generally U-shaped junctions are designated 68, 70, 72 and 74**.

Positioned between sides 34 and 38 about midway between sides 32 and 36 is rod 80 which connects side 34 with side 38. Rod 80 is generally parallel to sides 32 and 36. Positioned one on each side 44 and 48 directly beneath rod 80 are loops 82 and 84. These loops engage the hooked ends 86 and 88 of coil springs 90 and 92 which are fastened to either side of rod 94.

Use of the carriage assembly is relatively easy. The reel or reel case 4 provided with hook 8 is hooked over rod 80 and the reel assumes a position within the cage-like carriage structure. Rod 94 is then inserted through the core of the reel and hooked ends 86 and 88 of coil springs 90 and 92 are engaged into loops 82 and 84 respectively. This causes the coil springs to extend into a tensioned position as seen in FIG. 2. Rod 94 bears against the core of the reel or reel case uniting the reel or reel case to the carriage. The reel is thus prevented from free movement but is not held rigidly. Due to provision of the yielding coil spring, pressure against the reel causes it to move but movement is limited directly to the force or pressure applied. Thus damage to expensive reels mounted within the reel carriage is precluded.

Figure 5:
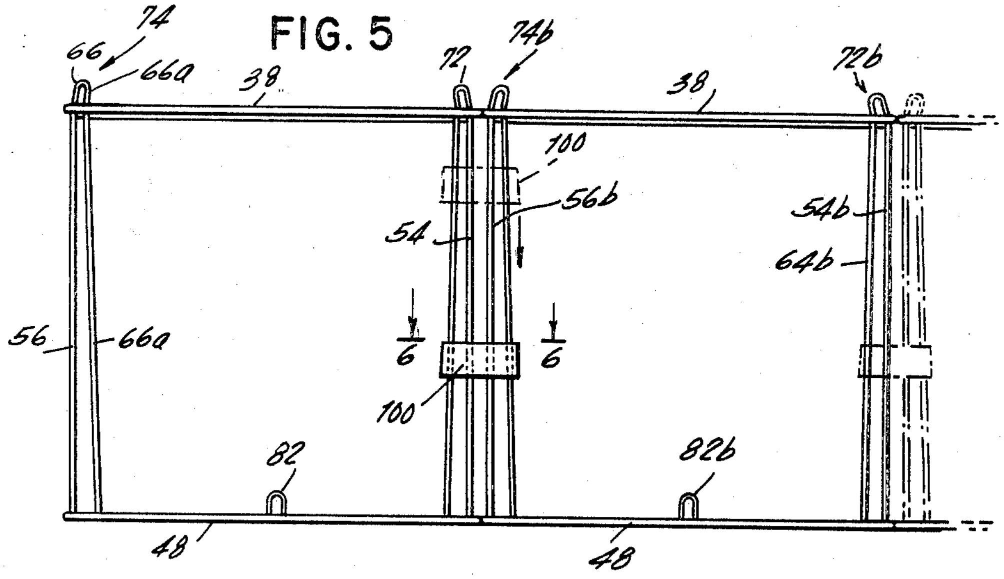
FIGURE 5 shows two reel carriages positioned side by side and affixed together by a fastener.
Figure 6:
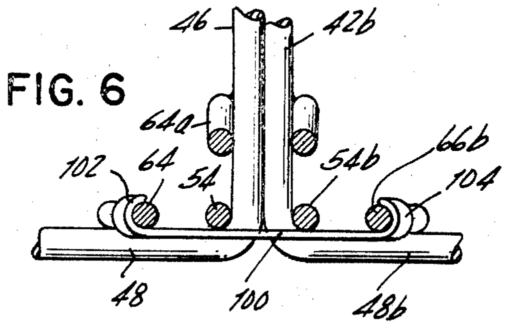
FIGURE 6 is a sectional elevation taken along the line 6—6 of FIG. 5.

Use of the reel carriages in conjunction with other similar carriages is illustrated in FIGS. 5–8 in which like parts of like carriages are given like reference numerals, the only difference being a letter following the particular part. A carriage connected side by side to another carriage is illustrated in FIG. 5. The connection is by virtue of fastener 100 having upwardly tapering curved portions 102 and 104. The fastener 100 is placed so that curved portion 102 is over wire 64 and curved portion 104 over wire **66*b*. It is then slid down until further downward movement is prevented by the outward tapering of wires 64 and 66*b*** from one another. At that point the carriages are locked together firmly.

Figure 8:
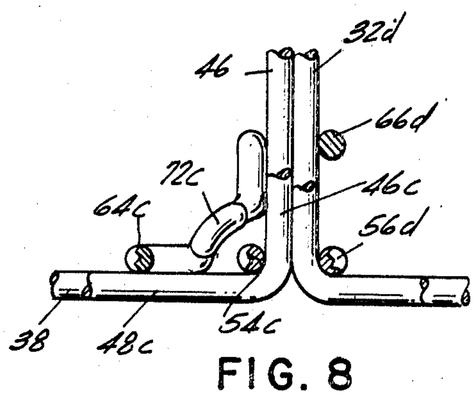
FIGURE 8 is a sectional elevation taken along the line 8—8 of FIG. 7.
Figure 7:
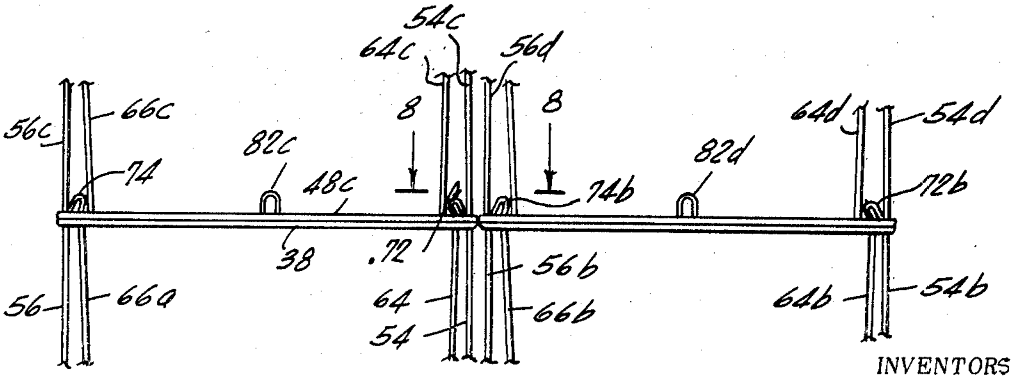
FIGURE 7 shows the top half of two carriages aligned side by side and the bottom halves of two other carriages which are positioned over the first two carriages.

FIGS. 7 and 8 show two carriages positioned over two other carriages locked side by side. In this instance the U-shaped members 72 and 74 on the left half and **72*b* and 74*b*** on the right half of the assembly serve as guide members to assist the seating of the upper carriages over the lower carriages. These U-shaped members extend upwardly and inwardly toward the center of the overlying carriage.

From the foregoing it is apparent that a significantly useful reel carriage has been provided. It is one in which the reels or reel cases carried therein can move slightly in response to pressure but only as permitted by the coil springs. During normal carrying of a carirage of reels or reel cases little movement of the same is permitted. Thus, the reels or reel cases cannot become damaged by free movement within a carton or the like. Additionally, the carriage can be readily locked on any side with a similar carriage, can be stacked on similar carriages and can have similar carriages stacked thereon. Accordingly, it is very useful for storing computer reel cases containing computer reels especially where many reels are to be stored together.

The terms and expressions used herein have been used as terms of description and not of limitation as there is no intention, in the use of such terms and expressions, of excluding any equivalents or portions thereof, as many modifications are possible within the spirit and scope of the appended claims.

What is claimed is:

1. A reel carriage adapted to carry reels or reel cases provided with a hooking member on the periphery thereof and a hollow core, said carriage comprising a generally rectangular cubic container, a first rod extending between two parallel top sides and connecting the same, a second rod positioned beneath said first rod and in the same vertical plane as said first rod, said second rod positioned when containing a reel or reel case in elevated position from the bottom sides via yielding members, said second rod adapted to pass through the core of a reel or reel case suspended therein and to bear against said core.

2. A reel carriage according to claim 1, wherein on the top corners of said carriage there are upwardly and inwardly extending members adaptable to function as the seat for a second reel carriage positioned thereover.

3. A reel carriage according to claim 2, wherein at each bottom corner there are a pair of wires one each originating from a side forming the base of said carriage at a point proximate said corner, each of said wires rising toward one another and terminating at a junction above the top sides of said carriage, said junction comprising said upwardly and inwardly extending members forming the seat for a second reel carriage positioned thereover.

4. A reel carriage according to claim 2, wherein said carriage is constructed entirely of wire forming all corners and said yielding members are coil springs.

References Cited

UNITED STATES PATENTS

| | | | |
|---|---|---|---|
| 2,665,962 | 1/1954 | Truesdell | 211—40 |
| 3,298,530 | 1/1967 | Clouthier | 211—40 |
| 3,310,178 | 3/1967 | Wright | 211—40 |
| 3,323,847 | 6/1967 | Clouthier | 211—40 |

JAMES A. LEPPINK, Primary Examiner

U.S. Cl. X.R.

312—20